A. C. BELL.
ALTERNATING CURRENT MOTOR.
APPLICATION FILED MAR. 28, 1910.
1,015,534.
Patented Jan. 23, 1912.
2 SHEETS—SHEET 1.
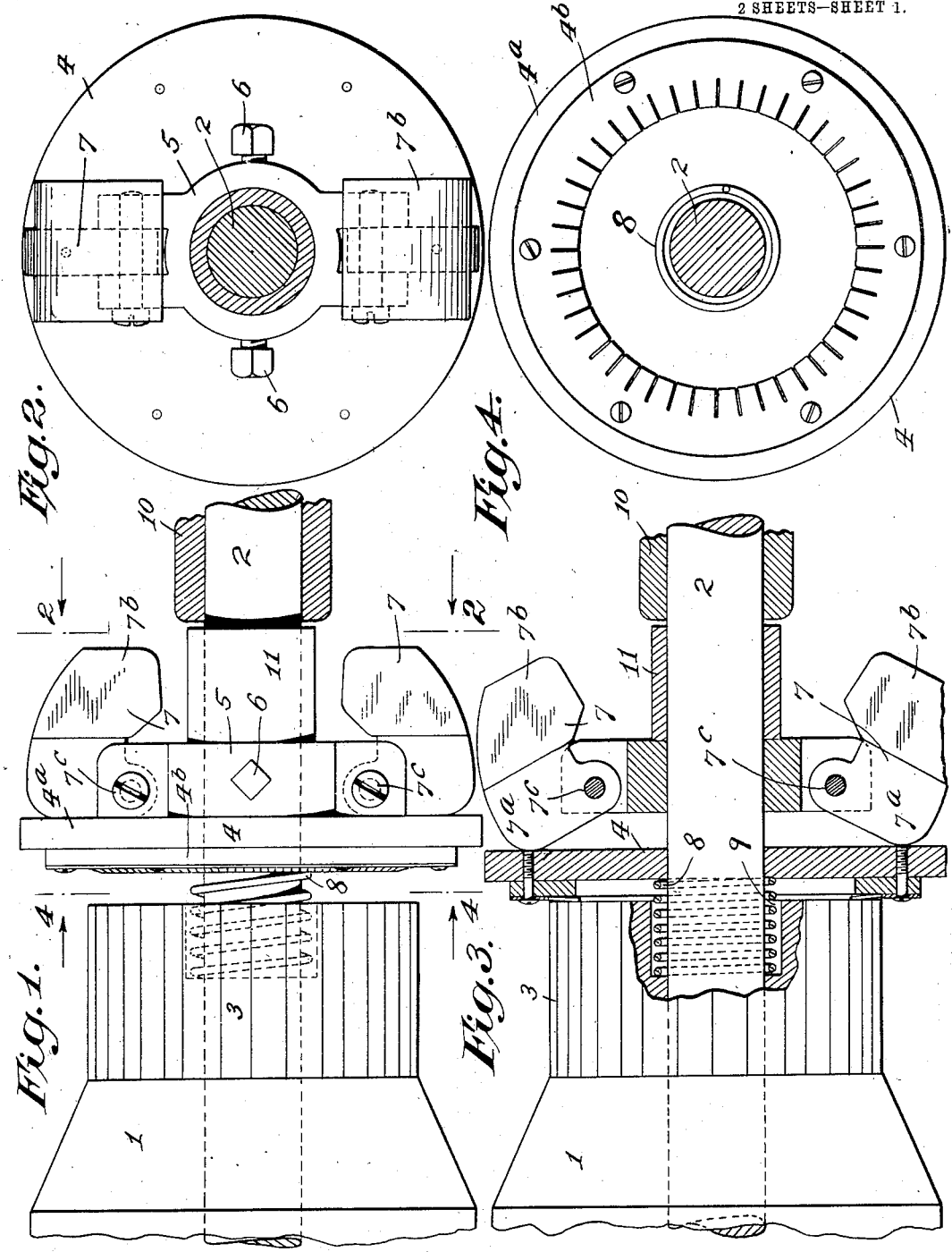
Attest:
Edw. R. Moreland
Alan C. McDonnell
Inventor:
Alonzo C. Bell
by
E. W. Scherr Jr. Atty A. C. BELL.
ALTERNATING CURRENT MOTOR.
APPLICATION FILED MAR. 28, 1910.
1,015,534.
Patented Jan. 23, 1912.
2 SHEETS—SHEET 2.
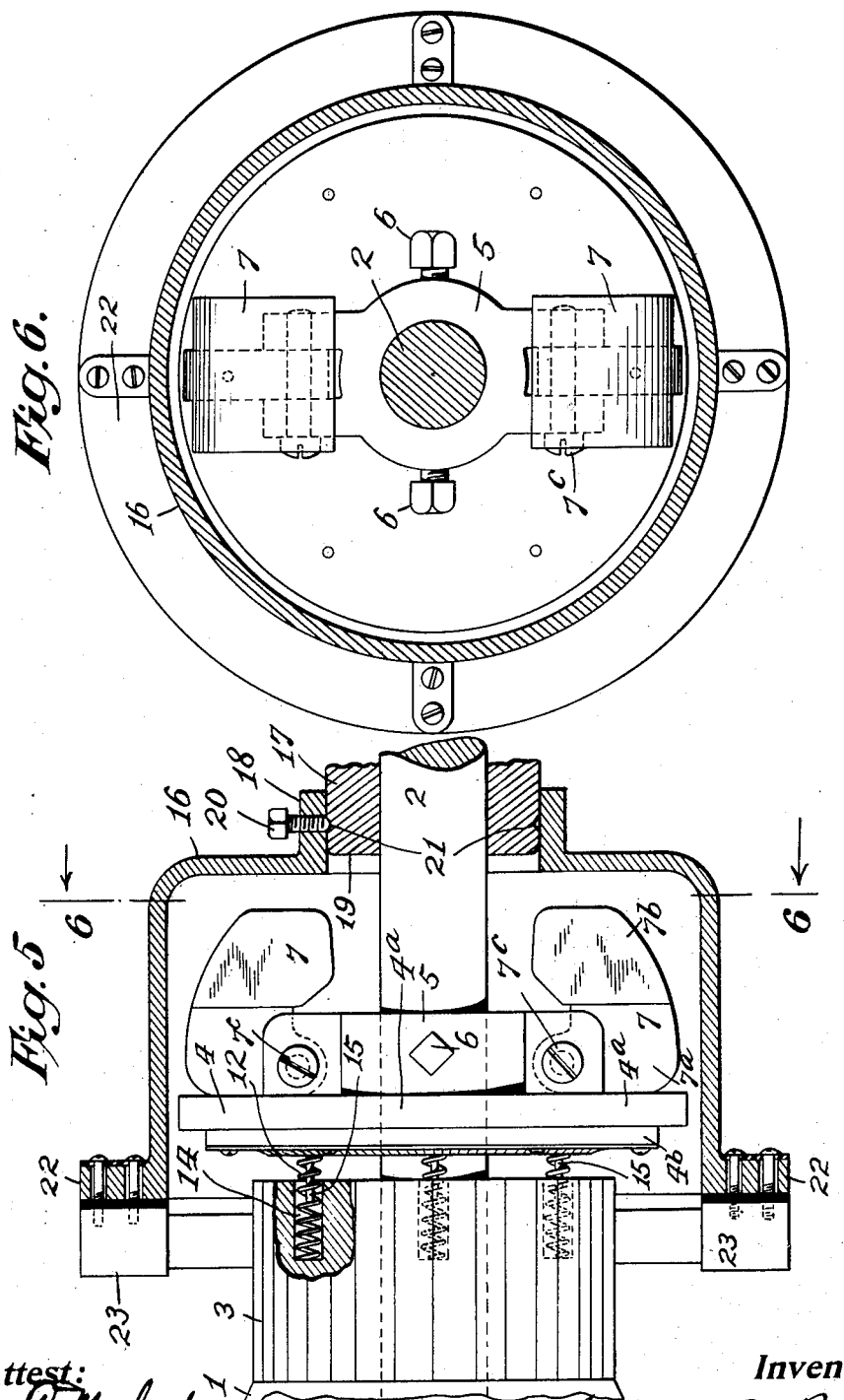
Attest:
Edna A. Moreland
Alan C. McDonnell
Inventor:
Alonzo C. Bell
by E. W. Schenk Jr. Atty

UNITED STATES PATENT OFFICE.

ALONZO C. BELL, OF WESTFIELD, NEW JERSEY.

ALTERNATING-CURRENT MOTOR.

1,015,534. Specification of Letters Patent. Patented Jan. 23, 1912.

Application filed March 28, 1910. Serial No. 551,950.

*To all whom it may concern:*

Be it known that I, ALONZO C. BELL, a citizen of the United States, and resident of Westfield, Union county, New Jersey, have invented certain new and useful Improvements in Alternating-Current Motors, of which the following is a specification.

My present invention relates to an attachment for alternating current motors, especially self-starting single phase motors.

The invention belongs to the general class of centrifugal devices for short circuiting the armature-coils of the motor, after rotation has been started as a repulsion, series, shunt or other alternating current motor kind of operation. However, the present device differs in the important feature that it does not act to short circuit the armature until after the motor has approached full speed, whereupon it acts rapidly, bringing the short circuiting member into quick positive contact with the commutator. The same is true of the reverse action in stopping the motor.

The advantages are the important ones that sparking and burning away of the contacting parts is very materially lessened, and even more importantly, the motor is given a chance to build up to its proper speed and power before the short circuiting occurs. The importance of this last advantage will be apparent when it is recalled to mind that short circuiting the commutator too soon, will prevent the motor from exerting sufficient power to carry its full load up to speed.

In the drawings, which show one of the forms which my improvements may take, Figure 1 is a side elevation partly in section of the commutator end of a motor embodying my invention, parts immaterial to the present invention being either omitted or broken away; Fig. 2 is an elevation partly in vertical section on the line 2—2 in Fig. 1; Fig. 3 is the same as Fig. 1 except it shows the parts in the positions occupied when the motor is at speed; Fig. 4 is an elevation partly in section on the line 4—4 in Fig. 1; Fig. 5 is a view of a modification in other respects corresponding to Fig. 1; and Fig. 6 is a vertical section partly in elevation on the line 6—6 in Fig. 5.

I will now describe in detail the devices of the drawings, reserving it to the claims to point out the novel features and to define the scope of the invention, it being understood that said claims are to be given due range of equivalents.

The drawings show only a portion of the armature of the motor, the field-coils and other parts unessential to an understanding of the invention having been omitted.

1 designates the armature, 2 the motor shaft, 3 the commutator.

4 is a commutator short-circuiting member, consisting of a disk $4^a$ slidable on the motor shaft to and from the end of the commutator, and a metal ring $4^b$ whose outer diameter is greater than that of the commutator and whose inner edge is raised and slitted to act as the actual contacting part of the commutator short-circuiting member.

5 is a plate held stationary on the shaft by set screws 6. Elbow levers 7 have pivotal connection at $7^c$ with the plate 5 and work in slots therein. The levers are arranged to have one of their arms $7^a$ normally in flat contact with the short circuiting member 4. The levers 7 are weighted at $7^b$ whereby, under the action of centrifugal force due to the rotation of the motor shaft, the weighted portions are impelled outward and the arms $7^a$ laterally to carry the short-circuited member 4 toward the commutator.

It will be noted that each elbow lever has an abrupt curve at its corner connecting the aforesaid outer flat face of its pivoted arm with its weighted arm. The fact that the pivoted arm of each elbow lever is in flat contact with the face of the short-circuiting plate puts the lever at a mechanical disadvantage in starting the movement of the plate toward the commutator, as does also the fact that the elbow or corner of each lever is an abrupt or non-gradual curve. The purpose is therefore accomplished of delaying the actuation of the plate into short-circuiting position until the motor is well up to speed and not before.

8 is a spiral spring located in commutator recess 9 surrounding the motor shaft and acting upon the short circuiting member in the direction of holding it out of contact with the commutator and against the arms $7^a$ of the elbow levers.

10 indicates the bearing for the commutator-end of the motor-shaft and 11 is a collar on the shaft between the elbow levers and the bearing to prevent accidental contact between said levers and the bearing.

The combination of devices is such that the spring 8 holds the short-circuiting member 4 against the arms 7ª of the elbow levers, causing them to act at such mechanical disadvantage that it takes an amount of centrifugal force corresponding with a rotation of the motor approaching full speed, before the levers by the centrifugal action of their weighted portions, are able to overpower the spring. However, when this critical speed is reached and the short-circuiting member 4 has begun to be moved in the direction of the commutator, it continues with a quick, positive motion into contact with the commutator because the leverage, which theretofore has been practically nil, now constantly increases with the angular movement of the levers about their pivots, as does also the distance of their weighted portions from the center of rotation which in turn results in a proportionately rapid increase in the centrifugal power of the levers. The advantages of delaying the action of the short-circuiting member until the motor has approached full speed and then to effect said short-circuiting, in a quick, positive manner, have already been pointed out.

In the drawings, only two of the levers are shown. Of course, there may be more. Also, in the claims, the elbow member has been defined singularly, by which, however, it is intended to include any number. Furthermore, when it is stated that the short circuiting device acts when the motor approaches full speed, this includes any speed at or above which, the motor will build up to synchronous speed and power with its commutator short-circuited.

In the modifications of Figs. 5 and 6, the short circuiting devices shown are substantially the same as those of the previous figures. One of the modifications consists in using other coiled springs 12 to hold the short circuiting member 4 out of operation. There may be any required number of these springs. Their advantage over the spring 8 surrounding the motor shaft is that the latter is necessarily of large diameter and cannot be given the same stiffness which is easily obtainable with the other springs 12 with their small diameter. Longitudinal sockets 14 in the end of the commutator serve to house one end of these springs, whereas their other ends bear against the face of the disk 4ª. Pins 15 project from this disk axially within the coils of the springs 12 and serve to support said coils.

No attempt has been made in the drawings to show the commutator bars, but it will be understood that the sockets 14 will ordinarily be located in the core portion of the commutator, being the portion surrounded by the bars.

A further modification consists in the addition of the cylindrical member 16 supported from the bearing 17 and acting as a combined cover for the centrifugal devices and holder for the brushes. It has a central sleeve 18 received over the cylindrical end 19 of the bearing. A set screw 20 projects through the wall of the sleeve 18 and its end works in a circumferential groove 21 in the end 19 of the bearing. The cover at its opposite end has a radial flange 22 on which the brush holders 23 are mounted. Only two brush holders are shown, but of course there may be more. Thus, the cover 16 acts to protect the operator from any possible contact with the centrifugal devices, also prevents said devices from flying in the event of breakage. In addition, the cover acts as an adjustable support for the brushes. Thus, by loosening the set screw 20, the cover 16 may be rotated to adjust the brushes into any desired angular position for the best operation of the motor, whereupon tightening the set screw maintains said adjustment.

Having thus described my invention, what I claim is:

1. In an alternating current motor, the combination of a commutator, a short-circuiting member on the shaft movable into and out of short-circuiting position relative to the end of the commutator, said member comprising a supporting part movable on the shaft and a ring of sheet metal on the face of the said supporting part next the end of the commutator, said ring having its inner periphery slitted and raised to come in contact with the end of the commutator and having its outer periphery larger in diameter than the commutator, means being provided at said outer periphery for securing the ring to the supporting part, and means for centrifugally operating the short-circuiting member.

2. In an alternating current motor, the combination of the motor shaft, a commutator on said shaft, a short-circuiting plate slidable on the shaft between a non-short-circuiting position away from the commutator, and a short-circuiting position in contact with the commutator, weighted elbow levers for actuating the plate into short-circuiting position but having no permanent connection therewith, each of said levers being pivoted by the end of one of its arms to the shaft at a point adjacent the non-short-circuiting position of the plate and so that the lever pivots in the direction of the length of the shaft,—said pivoted arm of the elbow lever extending outwardly from the shaft and having a flat outer face which is in flat contact with the face of the short-circuiting plate when the latter is in its non-short-circuiting position,—the other arm of said elbow lever extending away from the short-circuiting plate in the direction of the shaft and being weighted,—each of said levers further having an abrupt corner between the described outer flat face of the pivoted arm of the lever and the outer face of the other arm of the lever; and means actuating the short-circuiting plate yieldingly away from its short-circuiting position and toward its non-short-circuiting position.

Witness my hand this 11th day of March 1910, at New York city.

ALONZO C. BELL.

Witnesses:
STEPHEN S. NEWTON,
E. W. SCHENP.